July 7, 1925.
G W. CUNNINGHAM
SAFETY ATTACHMENT FOR FORDS
Filed July 15, 1924
1,545,307
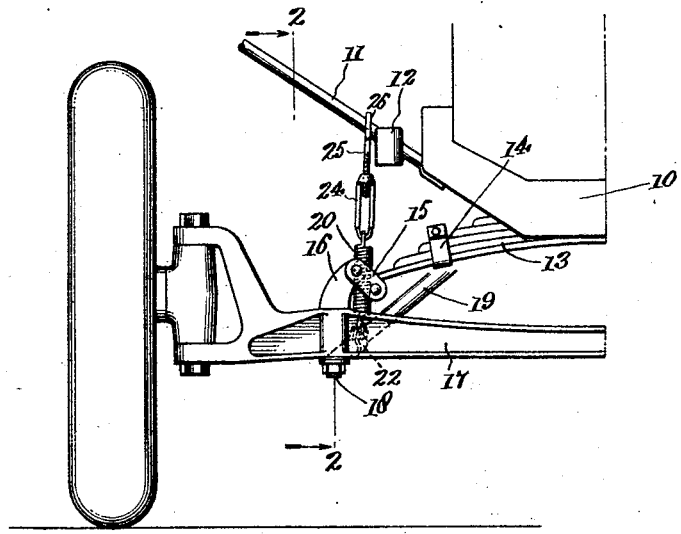
Fig. 1.
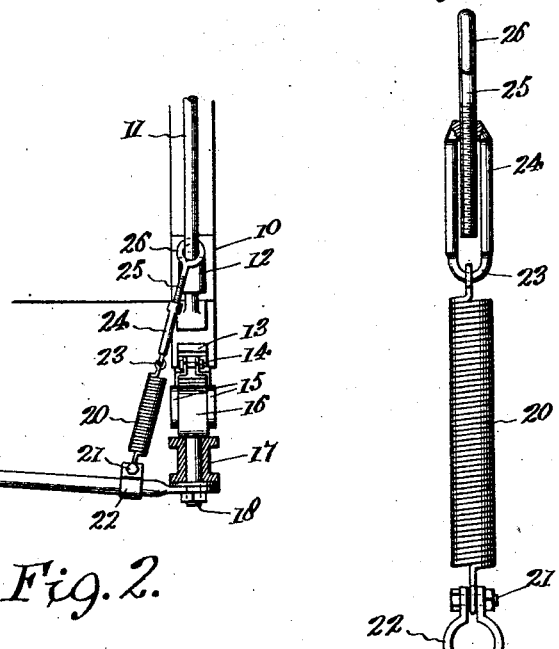
Fig. 2.
Fig. 3. Fig. 4.
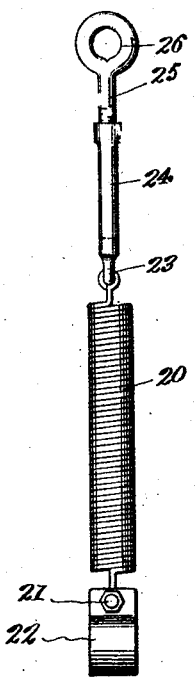
Inventor
G. W. Cunningham
by Wilkinson & Giusta
Attorneys Patented July 7, 1925.

1,545,307

UNITED STATES PATENT OFFICE.

GEORGE W. CUNNINGHAM, OF ALBANY, LOUISIANA.

SAFETY ATTACHMENT FOR FORDS.

Application filed July 15, 1924. Serial No. 726,186.

*To all whom it may concern:*

Be it known that I, GEORGE W. CUNNINGHAM, a citizen of the United States, residing at Albany, in the parish of Livingston and State of Louisiana, have invented certain new and useful Improvements in Safety Attachments for Fords; and I do hereby declare the following to be a full, clear, and exact description of the invention, such as will enable others skilled in the art to which it appertains to make and use the same.

The present invention relates to motor vehicles and more particularly to a safety device adapted for use with cars of the Ford or other type having the arrangement of parts capable of receiving the device.

An object of the present invention is to provide a safety device for attachment to Ford cars which is coupled to the front end of the radius rod at each side of the car, so that upon breakage of the radius rods the same are not permitted to drop into the roadway and catch therein, and cause damage as is frequently done at the present time.

Another object of the invention is to provide a device of this character which may be arranged between the radius rod and the body of the car, such as between the radius rod and the front fender brace to prevent the side sway of the car and the consequent turning over of the same as frequently occurs incident to this side sway or rolling when the car is turned abruptly or is driven along the side of a steep slope.

A further object of the invention is to provide a safety attachment of this character which is capable of performing its functions of restricting the relative movements of the parts of the running gear and body within safe bounds and which at the same time acts as a shock absorber or snubber to materially aid in the comfort of riding.

A further object of the invention is to provide a device of this character which is in the form of an attachment and which may be applied to the usual parts of the vehicle without altering or changing the same, and a device which may be quickly and easily installed.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a front elevation of one side of a motor vehicle having the improved safety attachment applied thereto.

Figure 2 is a fragmentary enlarged sectional view taken vertically through the vehicle with the attachment applied thereto as shown by the line 2—2 in Figure 1.

Figure 3 is a detailed enlarged elevation of the safety attachment, part of the same being broken away to show the structure, and Figure 4 is a similar view taken axially at right angles to Figure 3.

Referring to the drawing 10 designates the body part of a motor vehicle which, as shown in the present instance may be of the Ford type or the like. The body is provided with a front fender brace 11 which projects outwardly and is inclined at an upward angle and provided intermediate its ends with a vertical socket 12 for receiving the shank of a lamp bracket or the like.

The body 10 is provided with the usual front spring 13 having a clip 14 at its end and connected by a shackle 15 to the front perch 16 which projects upwardly from the axle 17. The perch bolt 18 has secured to the lower end thereof one of the front ends of the radius rod 19 in the usual manner.

The safety device comprises a resilient portion 20 which may be in the form of a helical spring as shown and which at its lower end is secured by a bolt 21 to a clamping ring 22 of a size adapted to engage the radius rod 19 near its forward end as shown in Figure 2. The upper end of the spring 20 is hinged upon a loop 23 which is formed on the lower end of the buckle 24 of a turn buckle having a threaded stem 25, which is secured to the upper threaded end of the buckle 24. The stem 25 has an eye piece 26 on its upper end adapted to loosely engage over the fender brace 11 and is held in position by the socket 12, so as to hold the attachment substantially in line with the forward end of the radius rod 19. The clamp 22 is secured upon the forward end of the radius rod 19 and is spaced rearwardly from the axle 17 a distance sufficient to hold the spring 20 and the turn buckle 24 out of contact with the perch 16 and shackle 15, so that all of the parts may freely and independently operate during the flexing of the spring 13. The attachment is permitted to expand upon the rebound of the spring 13 but the resilient portion 20 of the device has sufficient strength to check the rebound and prevent the vehicle from rocking laterally beyond a predetermined extent so as to avoid the turning over of the vehicle at ordinary speeds.

The turn buckle 24 may be adjusted on the threaded stem 25 to secure the desired tension between the radius rod 19 and the fender brace 11, and this may be accomplished by removing the bolt 21, so that the spring 20 and buckle 24 may be turned as a unit until the desired length is attained.

It is obvious that various changes and modifications may be made in the details of construction and design of the above specifically described embodiment of this invention without departing from the spirit thereof, such changes and modifications being restricted only by the scope of the following claim:—

What is claimed is:—

A safety attachment for Ford cars for use at the side thereof between the fender brace and the radius rod, comprising a spring, a turn buckle secured to the upper end of the spring and having an eye piece on its upper end adapted to loosely fit over the fender brace and rest against the lamp post socket of the brace, and a clamp pivotally mounted on the lower end of the spring to embrace the adjacent forward end of the radius rod, said clamp being contractible to bind sufficiently tight on the radius rod to hold the spring in substantially vertical alinement beneath said eye piece and brace the car from a point near its front axle against lateral rocking, said clamp and spring also being adapted to support the radius rod in substantially normal position upon the breakage of the radius rod.

GEORGE W. CUNNINGHAM.